United States Patent
Itzinger et al.

(10) Patent No.: US 10,647,432 B2
(45) Date of Patent: May 12, 2020

(54) AIRPLANE SEAT DEVICE WITH FOLDABLE AIRPLANE SEAT

(71) Applicant: RECARO Aircraft Seating GmbH & Co. KG, Schwaebisch Hall (DE)

(72) Inventors: Andreas Itzinger, Michelfeld (DE); Jürgen Baumann, Bodman-Ludwigshafen (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 79 days.

(21) Appl. No.: 15/756,253

(22) PCT Filed: Aug. 29, 2016

(86) PCT No.: PCT/EP2016/070313
§ 371 (c)(1),
(2) Date: Jul. 25, 2018

(87) PCT Pub. No.: WO2017/037017
PCT Pub. Date: Mar. 9, 2017

(65) Prior Publication Data
US 2018/0312258 A1  Nov. 1, 2018

(30) Foreign Application Priority Data
Sep. 3, 2015  (DE) .......... 10 2015 114 762

(51) Int. Cl.
*B64D 11/06* (2006.01)
*B60N 2/30* (2006.01)
*B60N 2/75* (2018.01)

(52) U.S. Cl.
CPC .......... *B64D 11/0644* (2014.12); *B60N 2/305* (2013.01); *B60N 2/309* (2013.01);
(Continued)

(58) Field of Classification Search
CPC .... B64D 11/0644; B64D 11/06; B60N 2/753; B60N 2/3031; B60N 2/305; B60N 2/3056; B60N 2/309
(Continued)

(56) References Cited

U.S. PATENT DOCUMENTS 4,005,902 A    2/1977  Balin
5,829,836 A    11/1998 Schumacher et al.
(Continued)

FOREIGN PATENT DOCUMENTS

DE    1086130 B     7/1960
DE    19534024 A1   3/1997
(Continued)

OTHER PUBLICATIONS

Search Report dated May 31, 2016 issued in corresponding DE patent application No. 10 2015 114 762.9 (and partial English translation thereof).
(Continued)

*Primary Examiner* — Mark R Wendell
(74) *Attorney, Agent, or Firm* — Posz Law Group, PLC (57) ABSTRACT

An airplane seat device with at least one airplane seat is at least configured to be adjusted between a use position and a stowage position. In the stowage position, the airplane seat has a maximum height which is equal to or less than a maximum height in the use position.

15 Claims, 5 Drawing Sheets

(52) U.S. Cl.
CPC ......... *B60N 2/3031* (2013.01); *B60N 2/3056* (2013.01); *B60N 2/753* (2018.02); *B64D 11/06* (2013.01)

(58) Field of Classification Search
USPC .......................................................... 297/35
See application file for complete search history.

(56) References Cited

U.S. PATENT DOCUMENTS

| | | | |
|---|---|---|---|
| 7,926,873 B2* | 4/2011 | Rombouts | B64D 11/00155 297/188.1 |
| 8,070,233 B2* | 12/2011 | Schumacher | B60N 2/3047 297/411.32 |
| 2003/0209929 A1 | 11/2003 | Muin et al. | |
| 2005/0067873 A1* | 3/2005 | Iyoda | B60N 2/3031 297/378.14 |
| 2009/0283636 A1 | 11/2009 | Saint-Jalmes et al. | |
| 2010/0218225 A1 | 8/2010 | Wilcynski et al. | |
| 2011/0260489 A1* | 10/2011 | Gerhardt | B60N 2/3031 296/65.01 |
| 2014/0027572 A1 | 1/2014 | Ehlers et al. | |
| 2014/0306061 A1 | 10/2014 | Schomacker et al. | |
| 2014/0339364 A1 | 11/2014 | Ehlers et al. | |

FOREIGN PATENT DOCUMENTS

| | | |
|---|---|---|
| DE | 10214104 C1 | 12/2003 |
| DE | 102009004987 A1 | 7/2010 |
| DE | 102012014619 A1 | 1/2014 |
| DE | 102013008289 A1 | 11/2014 |
| EP | 1645507 A1 | 4/2006 |

OTHER PUBLICATIONS

International Search Report ("ISR") dated Sep. 11, 2016 issued in corresponding International patent application No. PCT/EP2016/070313.

International Preliminary Report ("IPR") dated Mar. 15, 2018 issued in corresponding International patent application No. PCT/EP2016/070313.

* cited by examiner

AIRPLANE SEAT DEVICE WITH FOLDABLE AIRPLANE SEAT

CROSS REFERENCE TO RELATED APPLICATIONS

This application is a U.S. national stage application of PCT/EP2016/070313 filed on Aug. 29, 2016, which is based on German Patent Application No. 10 2015 114 762.9 filed on Sep. 3, 2015, the contents of which are incorporated herein by reference.

PRIOR ART

The invention relates to an airplane seat device according to the preamble of patent claim 1.

An airplane seat device with at least one airplane seat which is provided at least for being adjusted between a use position and a stowage position has already been proposed.

It is the object of the invention in particular to provide a device of the type in question with improved properties in respect of variability. The object is achieved according to the invention by the features of patent claim 1, while advantageous refinements and developments of the invention can be gathered from the dependent claims.

ADVANTAGES OF THE INVENTION

The invention is based on an airplane seat device with at least one airplane seat which is provided at least for being adjusted between a use position and a stowage position.

It is proposed that, in the stowage position, the airplane seat has a maximum height which is equal to or less than a maximum height in the use position. An "airplane seat" is intended to be understood here as meaning in particular a seat which is provided to be mounted in an airplane cabin of an airplane. The airplane seat here preferably has a mounting unit, by means of which the airplane seat can be fixedly mounted on a cabin floor of the airplane cabin. The airplane seat here is preferably designed as part of a seat row which has a plurality of substantially identically designed airplane seats which are mounted on the cabin floor via a common mounting unit. The airplane seat preferably has a seat bottom, a backrest coupled to the seat bottom, at least one seat divider and at least one armrest. A "seat bottom" is intended to be understood here as meaning in particular a unit which forms the seat region for a passenger, wherein the seat bottom here is preferably formed by a basic body and a cushion attached to the basic body. A "seat region" is intended to be understood here as meaning in particular a region of the airplane seat that is provided for a passenger to sit thereon, in particular during a flight. A "backrest" is intended to be understood here as meaning in particular a unit of the airplane seat that forms a backrest support surface, against which a passenger sitting on the airplane seat can lean his/her back. The backrest here preferably comprises at least one basic body and a cushion which forms the backrest support surface. The backrest is arranged here at a rear end of the seat bottom and extends from the seat bottom upward, away from a mounting unit. An "armrest" is intended to be understood here as meaning in particular a unit which forms at least one support surface, on which a passenger sitting on the airplane seat can at least partially rest his/her arm. In order to form the at least one support surface, the armrest unit here has at least one support element. The armrest here bounds the seat region of the airplane seat laterally. A "seat divider" is intended to be understood as meaning in particular a component of the airplane seat or of a seat row with at least two airplane seats arranged laterally next to each other, which component is arranged at least substantially above at least one supporting tube with respect to a vertical direction, which is oriented vertically with respect to a mounting plane of the airplane seat, at least in the use position. In particular, the seat divider is a rigidly formed component of the seat row. The seat divider is provided in particular for the mounting of the armrest. The seat divider is preferably provided for permitting the connection of a belt. In particular, the seat divider is provided for receiving a supporting tube receptacle. The seat divider preferably forms a lateral delimitation of at least one of the airplane seats arranged next to each other in a seat row, wherein the seat divider can be arranged at the aisle side and/or at the inboard side, and/or may form a delimitation between two airplane seats arranged laterally next to each other in a seat row. In particular, the seat divider is a constituent part of a force dissipation path which runs via the backrest unit, the seat divider, a supporting tube structure and the mounting unit into the mounting plane, in particular into an airplane floor. A "use position" is intended to be understood here as meaning in particular a position of the airplane seat, in which the latter is mounted in the airplane cabin in a manner in which said airplane seat can be used as intended by a person, wherein the airplane seat is in particular constructed in such a manner that a passenger can sit on the airplane seat as intended, in particular during a flight. A "stowage position" is intended to be understood here as meaning in particular a position of the airplane seat, in which in particular a person is unable to sit on the airplane seat as intended, wherein the airplane seat here preferably has as small dimensions as possible such that it can be arranged in a particularly space-saving manner in the stowage position. A "maximum height of the airplane seat" is intended to be understood here as meaning in particular a greatest height of the airplane seat which the latter has vertically, as measured from the mounting plane. The maximum height of the airplane seat in the use position is preferably given here by the distance which is measured orthogonally with respect to the mounting plane and at which the upper end of the backrest is from the mounting plane. A maximum height in the use position of the airplane seat differs here depending on the specification of the airplane manufacturers and/or airlines, but is preferably 45 inches. In principle, it is also conceivable for the maximum height of the airplane seat to be different from the 45 inches, i.e. to be larger or smaller. "Provided" is intended to be understood as meaning in particular specially designed and/or equipped. The fact that an object is provided for a certain function is intended to be understood as meaning in particular that the object carries out and/or implements said certain function in at least one use state and/or operating state. A configuration according to the invention makes it possible to provide an airplane seat or a seat row which can be adjusted particularly advantageously between a use position and a stowage position, wherein the airplane seat can be designed in a particularly space-saving manner, in particular in the stowage position. As a result, it is possible in particular to provide a particularly advantageously flexible seating arrangement of an airplane cabin, which can be adapted simply and rapidly to a number of flight passengers in order thereby to achieve a particularly advantageous balance between as large a seat region as possible for a passenger and as large a number as possible of airplane seats on which a passenger can sit.

In addition, it is proposed that, in the stowage position, the airplane seat has a backrest height which is less than 45 inches. A "backrest height" is intended to be understood here as meaning in particular a maximum height of the backrest, wherein the height here is measured orthogonally with respect to the mounting plane on which the airplane seat is mounted. The backrest height preferably corresponds here to the maximum height of the airplane seat. As a result, the airplane seat can advantageously be designed in such a manner that, even in the stowage position, it does not project beyond other airplane seats, which are in the use position, and thereby, for example, impairs a view within the cabin.

It is furthermore proposed that, in the stowage position, the airplane seat has an aisle side height which is less than 25 inches. An "aisle side height" is intended to be understood here as meaning in particular a height of the airplane seat in an aisle region facing an aisle of the airplane cabin, wherein the aisle region here reaches from an outer airplane seat end which faces the aisle and is preferably formed by the armrest, as far as an outer backrest end which faces the aisle. The aisle here has a prescribed upper aisle width above 25 inches, which is greater than a prescribed lower aisle width below 25 inches, wherein components above 25 inches may not protrude into the aisle region. Components which protrude into the aisle region may not be higher than 25 inches. It is thus advantageously possible to provide an airplane seat which, even in the stowage position, has a lower height in the aisle region, as a result of which, in particular, an advantageously wide aisle region can be achieved.

Furthermore, it is proposed that the airplane seat has at least one backrest, at least one seat divider, at least one armrest, at least one seat bottom and/or at least one adjustment mechanism, wherein the backrest, the seat divider, the armrest and/or the seat bottom are at least partially adjusted during an adjustment between the use position and the stowage position of the airplane seat by means of the adjustment mechanism. An "adjustment mechanism" is intended to be understood here as meaning in particular a mechanism, by means of which the airplane seat can be adjusted at least between the use position and the stowage position. The adjustment mechanism here has at least one support point, but preferably a plurality of support points, by means of which the various components of the airplane seat can be moved with respect to one another, in particular pivoted with respect to one another. As a result, the airplane seat can be particularly advantageously be designed for being adjusted between a use position and a stowage position.

It is furthermore proposed that the at least one adjustment mechanism moves the backrest substantially vertically downward during an adjustment from the use position into the stowage position. "Moving substantially vertically downward" should be understood here as meaning in particular displaced in the direction of the mounting plane along a displacement direction which is substantially orthogonal to the mounting plane, wherein the displacement direction here deviates by at most 30, preferably by at most 15 degrees, from an axis which is exactly orthogonal to the mounting plane. As a result, the airplane seat can take up a particularly advantageously small stowage position.

Furthermore, it is proposed that at a rear end of the seat divider, the adjustment mechanism has at least one support point via which the seat divider is connected rotatably to the backrest and/or to the armrest. A "rear end of the seat divider" is intended to be understood here as meaning in particular an end of the seat divider that is arranged at the rear, as seen in the seat direction. The adjustment mechanism can thereby be formed in a particularly advantageous manner.

Furthermore, it is proposed that at the lower end of the backrest, the adjustment mechanism has a coupling point with which the backrest is coupled to the at least one seat divider in the use position. A "lower end of the backrest" is intended to be understood here as meaning in particular a backrest end which, in the fitted state, faces the mounting plane. It is conceivable here for the coupling point to be arranged in a lower region of the backrest. As a result, in the use position, the backrest can be particularly simply and securely coupled non-rotatably to the seat divider and therefore secure mounting of the airplane seat can be ensured.

In addition, it is proposed that the adjustment mechanism has at least one retraction kinematic which is provided for folding in the armrest during an adjustment into the stowage position. A "retraction kinematic" is intended to be understood here as meaning in particular a kinematics which comprises at least one lever element via which the armrest automatically folds in during an adjustment of the airplane seat from the use position into the stowage position. As a result, the armrest can advantageously be brought automatically into a stowage position during an adjustment from the use position, and therefore the airplane seat device is designed to be operable particularly advantageously and simply—

It is furthermore proposed that the at least one seat divider has at least one coupling point which is designed as a recess and in which the coupling point, which is formed by the backrest, of the adjustment mechanism can engage in a form-fitting manner at least in the use position. A "coupling point" is intended to be understood here as meaning in particular a point which, by means of its configuration, for example by being configured in the form of a trough, forms a form-fit element and is thereby provided for form-fitting coupling to a correspondingly designed element. As a result, the backrest can be particularly simply and advantageously locked in the use position.

Furthermore, it is proposed that the airplane seat has at least one front seat foot which, for the transfer of the airplane seat into the stowage position, is provided for being decoupled from a guide rail. A "seat foot" is intended to be understood here as meaning in particular a foot of the airplane seat, which fixedly couples at least one supporting tube of the mounting unit of the airplane seat to the cabin floor in a use state. The airplane seat preferably has at least two front seat feet, wherein the forces which act on the airplane seat are at least partially introduced into the cabin floor via the two seat feet. "Decoupled" is intended to be understood here as meaning in particular that the seat foot is detached from the guide rail and is no longer guided therein. In principle, however, it is also conceivable for a decoupled seat foot not to be released from the guide rail, but rather to be moved out of its use position via kinematics and/or a telescopic linkage in such a manner that forces which act on the airplane seat can no longer be introduced into the cabin floor via the seat feet. As a result, the seat foot can advantageously be detached from the cabin floor, and therefore the airplane seat can be particularly advantageously folded together.

It is furthermore proposed that the airplane seat has at least one rear seat foot which is provided for being coupled to a guide rail via at least one coupling point. "By at least one coupling point" is intended to be understood here as meaning in particular that at least one coupling point is attached to the seat foot and is arranged in a form-fitting manner in the guide rail. The coupling point here is preferably formed by a fitting connected to the seat foot. The rear seat foot is preferably connected here to the guide rail in a form-fitting manner by two coupling points which are arranged one behind the other, engage in the same guide rail and are designed as fitting. In principle, it is also conceivable for the rear seat foot to be connected to the guide rail via a coupling point which is formed by a long fitting which has an extent in the direction of the guide rail that is greater than the extent of a normal fitting. As a result, the rear seat foot can be coupled particularly stably and securely to the cabin floor and, in particular in the stowage position of the airplane seat, can guarantee a secure mounting of the airplane seat.

Furthermore, it is proposed that in the region of a rear support tube connection of the seat divider, the adjustment mechanism forms a support point via which the seat divider is coupled pivotably to the rear seat foot. A "support point" is intended to be understood here as meaning in particular a point via which two elements, in particular the seat divider and a seat foot, are mounted via a corresponding bearing element, in particular in a rotatory manner with respect to each other, via a sliding or rolling contact mounting. As a result, the adjustment mechanism can be formed particularly advantageously and the airplane seat can be moved particularly advantageously during an adjustment between the use position and the stowage position.

In addition, it is proposed that the airplane seat device has at least one further airplane seat which forms a seat row with the airplane seat. A "further airplane seat" is intended to be understood here as meaning in particular an airplane seat which is formed substantially identically to the one first airplane seat, wherein the further airplane seat here is arranged next to the first airplane seat and forms at least part of the seat row together with the one airplane seat. The airplane seat device preferably has a further, third airplane seat which is likewise formed substantially identically to the two other airplane seats, wherein all three airplane seats together form the seat row. The three airplane seats which form the seat row have common components, such as, in particular, supporting tubes and/or seat dividers. As a result, the airplane seat device can particularly advantageously provide seat rows which are adjustable between the use position and the stowage position.

Furthermore, it is proposed that the at least two airplane seats of a seat row are adjustable together between the use position and the stowage position. "Adjustable together" is intended to be understood here as meaning in particular that, by adjusting the one airplane seat between the use position and the stowage position, all further airplane seats of the seat row will be automatically correspondingly adjusted at the same time. A seat row which can be adjusted in a particularly simple manner and has a plurality of airplane seats can thereby be provided.

Furthermore, it is proposed that the at least one airplane seat has a width of 14 inches in the stowage position. A "width" is intended to be understood here as meaning in particular an extent of the airplane seat in a seat direction which reaches from a rear end of the airplane seat, i.e. preferably a rear side of the backrest, as far as a front end of the airplane seat, preferably a front edge of the seat bottom. As a result, the airplane seat can be particularly advantageously configured to be small when it is adjusted into its stowage position.

The airplane seat device according to the invention is not intended to be restricted here to the above-described application and embodiment. In particular, in order to carry out an operation described herein, the airplane seat device according to the invention can have a number of individual elements, components and units differing from a number thereof mentioned herein.

DRAWINGS

Further advantages will emerge from the description below of the drawings. The drawings illustrate an exemplary embodiment of the invention. The drawings, the description and the claims contain numerous features in combination. A person skilled in the art will expediently also consider the features individually and combine them to form further meaningful combinations.

DESCRIPTION OF EXEMPLARY EMBODIMENT

FIGS. 1 to 5 show an airplane seat device according to the invention. The airplane seat device has an airplane seat 10. The airplane seat 10 is part of a seat row 12 of the airplane seat device, which has a second airplane seat 14 and a third airplane seat 16. In principle, it would also be conceivable for the airplane seat 1 to be designed as an individual seat, or for the seat row 12 to have a different number of airplane seats 10, 14, 16, for example two or more than three. In a fitted state, the airplane seats 10, 14, 16 are mounted in a cabin (not illustrated specifically) of an airplane. For the mounting, the airplane cabin has at least two fastening rails which run in parallel and via which an airplane seat 10, 14, 16 and/or a seat row 12 can be fixedly connected to the cabin floor.

The airplane seat 10 has a use position and a stowage position. All of the airplane seats 10, 14, 16 of the airplane seat device have a use position and a stowage position. The airplane seats 10, 14, 16 of a seat row 12 are in each case displaceable together between their use position and the stowage position. The entire seat row 12 is thereby displaceable together between the use position and the stowage position. The airplane seats 10, 14, 16 are in each case useable here by a passenger in their use position. In the use position, the airplane seats 10, 14, 16 are in each case provided such that a passenger can sit on them. In the stowage position, the airplane seats 10, 14, 16 are not useable by a passenger. Passengers cannot sit on the airplane seats 10, 14, 16 in the stowage position of the airplane seats 10, 14, 16. In the stowage position, the airplane seats 10, 14, 16 are particularly advantageously folded up small and thereby take up little space in the airplane cabin. In the stowage position, the airplane seats 10, 14, 16 have a maximum height which is smaller than a maximum height in the use position. In principle, it would also be conceivable that, in the stowage position, a maximum height of the airplane seats 10, 14, 16 is equal to their maximum height in the use position.

The airplane seat 10 has a mounting unit 18. The airplane seat 10 is mounted on the cabin floor of the airplane via the mounting unit 18. All of the airplane seats 10, 14, 16 of the seat row 12 are mounted on the cabin floor via the mounting unit 18. The mounting unit 18 is designed as a common mounting unit 18 of all of the airplane seats 10, 14, 16 of the seat row 12. The mounting unit 18 comprises two front seat feet 20, 22. In principle, it is also conceivable for the mounting unit 18 to have a different number of front seat feet 20, 22. The front seat feet 20, 22 are arranged fixedly in the fastening rails of the airplane cabin via fittings 94, in a state fitted in the airplane cabin. The fittings 94 have a locking state and an unlocking state. In the locking state, the fittings 94 are arranged fixedly in the fastening rail and cannot be displaced axially in the respective fastening rail. As a result, in the locking state of the fittings 94, the front seat feet 20, 22 are arranged fixed in position in the fastening rail and therefore in the airplane cabin. In the unlocking state, the fittings 94 are arranged in an axially displaceable manner in the fastening rails. As a result, in the unlocking state of the fittings 94, the seat feet 20, 22 can be displaced axially in the fastening rails and can thus be correspondingly placed in the airplane cabin.

The mounting unit 18 comprises two rear seat feet 24, 26. In principle, it is also conceivable for the mounting unit 18 to have a different number of rear seat feet 24, 26. In a state mounted in the airplane cabin, the rear seat feet 24, 26 are each connected to the guide rail via at least one coupling point. The rear seat feet 24, 26 are connected to the guide rail via coupling points designed as fittings 96, 98. Each of the seat feet 24, 26 is coupled to the guide rail via two fittings 96, 98. The fittings 96, 98 have a locking state and an unlocking state. In the locking state, the fittings 96, 98 are arranged fixedly in the guide rail and cannot be displaced axially in the respective guide rail. As a result, in the locking state of the fittings 96, 98, the front seat feet 24, 26 are arranged in a fixed position in the fastening rail and therefore in the airplane cabin. In the unlocking state, the fittings 96, 98 are arranged in an axially displaceable manner in the fastening rails. As a result, in the unlocking state of the fittings 96, 98, the rear seat feet 24, 26 can be displaced axially in the fastening rails and can thus be correspondingly placed in the airplane cabin. The mounting unit 18 has a front support tube 28. The mounting unit 18 has a rear support tube 30. In principle, it would also be conceivable for the mounting unit 18 to only have one supporting tube. The front support tube 28 and the rear support tube 30 extend transversely over substantially the entire width of the seat row 12 and provide a basic structure for all of the airplane seats 10, 14, 16 of the seat row 12. In principle, it is also conceivable for the rear seat feet 24, 26 to each be coupled to the corresponding guide rail via an elongate fitting. The corresponding fitting here has an elongate extent in order to ensure better connection of the rear seat feet 24, 26 and advantageously to be able to introduce a torque into the guide rail particularly readily.

Only one airplane seat 10 of the seat row 12 will be described in more detail below, with the other airplane seats 14, 16 of the seat row 12 being of substantially identical design to the airplane seat 10 described. The airplane seat 10 is designed as an aisle-side seat. The airplane seat 10 is arranged on a side of the seat row 12 that faces an aisle of the airplane cabin. The airplane seat 10 is the first airplane seat 10 of the seat row 12 reachable from the aisle of the airplane cabin. The airplane seat 10 comprises a backrest 32, a seat bottom 34, and a first armrest 36, a second armrest 38, a first seat divider 40, a second seat divider 42 and an adjustment mechanism 44. The backrest 32, the seat bottom 34, the armrests 36, 38 and the seat dividers 40, 42 are adjustable with respect to one another via the adjustment mechanism 44 during an adjustment of the airplane seat 10 between the use position and the stowage position. In principle, it would also be conceivable that, in another refinement, the airplane seat 10 merely has a backrest and a seat bottom which are adjustable with respect to each other via an adjustment mechanism during an adjustment of the airplane seat between the use position and the stowage position. In principle, it would also be conceivable that, in a further refinement, the airplane seat merely has a backrest, a seat bottom and at least one seat divider which are adjustable with respect to one another via an adjustment mechanism during an adjustment of the airplane seat between the use position and the stowage position. In principle, it would also be conceivable that, in an additional refinement, the airplane seat merely has a backrest, a seat bottom and a seat divider which are adjustable with respect to one another via an adjustment mechanism during an adjustment of the airplane seat between the use position and the stowage position. In a further refinement, it would in principle also be conceivable that the airplane seat merely has a backrest, at least one armrest and at least one seat divider which are adjustable with respect to one another via an adjustment mechanism during an adjustment of the airplane seat between the use position and the stowage position.

The seat bottom 34 is connected to the mounting unit 18 via the two supporting tubes 28, 30. The seat bottom 34 is connected here by a front end to the front support tube 28 via fastening means (not illustrated specifically). The seat bottom 34 is connected rigidly to the rear support tube 30 by a rear end. The first seat divider 40 and the second seat divider 42 are connected rigidly to the supporting tubes 28, 30 of the mounting unit 18. The two seat dividers 40, 42 are of substantially identical design, and therefore only the first seat divider 40 will be described in more detail below and denoted in the figures. The two seat dividers 40, 42 each have a front receptacle 46 for the front support tube 28 and a rear receptacle 48 for the rear support tube 30. The receptacles 46, 48 are designed as form-fit elements via which the supporting tubes 28, 30 are connectable fixedly to the seat dividers 40, 42. The supporting tubes 28, 30 are secured axially here in the receptacles 46, 48. The first seat divider 40 is arranged on the aisle side of the airplane seat 10. In a fitted state, it is conceivable for the aisle-side first seat divider 40 to be covered by a covering. The seat divider 40 has a first partial region 50 which, in the fitted state, substantially extends between the two supporting tubes 28, 30. At its front end, the first partial region 50 of the seat divider 40 forms the first receptacle 46 and, at a rear end, forms the receptacle 48. The seat divider 40 has a second partial region 52 which is formed inclined with respect to the first partial region 50. The second partial region 52 directly adjoins a rear end of the first partial region 50. In the use position of the airplane seat 10, the second partial region 52 extends upward from the first partial region 50, i.e. away from the mounting plane. At a rear end of the second partial region, the seat divider 40 has a support point 54. The support point 54 is designed as an armrest receptacle. The armrest 36 is connected to the seat divider 40 via the support point 54 designed as an armrest receptacle. The armrest 36 is connected in an articulated manner to the seat divider 40 via the support point 54. The armrest 36 comprises an armrest body 56 which forms a support surface, on which a passenger can rest his/her arm, and an armrest carrier 58 which couples the armrest body 56 to the seat divider 40 via the support point 54. The armrest carrier 58 is connected by a lower end in an articulated manner to the seat divider 40 via the support point 54. The armrest carrier 58 is pivotable from its position in the use position of the airplane seat 10 in the direction of the first partial region 50 of the seat divider 40 about a pivot axis formed by the support point 54. At an upper end of the armrest carrier 58, the armrest body 56 is connected pivotably to the armrest carrier 58. From the use position, in which the armrest body 56 is oriented substantially parallel to the seat bottom 34, the armrest body 56 can be pivoted upward in the direction of the backrest 32 via the connection to the armrest carrier 58. In principle, it would also be conceivable for the backrest 32 also to be connected to the seat divider 40 via the support point 54.

The second seat divider 42 is arranged between the first airplane seat 10 and the second airplane seat 14. The second seat divider 42, which is formed substantially identically to the first seat divider 40, separates the first airplane seat 10 and the second airplane seat 14 from each other. The second seat divider 42 in an equivalent manner to the first seat divider 40 forms an armrest receptacle (not denoted specifically) for the armrest 38, via which the armrest 38 is coupled pivotably to the second seat divider 42. The second seat divider 42 has, below its receptacle for the front support tube 28, a support point 60. The front seat foot 20 is connected to the seat divider 42 via the support point 60. The front seat foot 20 is connected here to the seat divider 42 in an articulated manner. The support point 60 here forms an axis of rotation, via which the seat foot 20 is connected pivotably to the seat divider 42. The second seat divider 42, below its receptacle for the rear support tube 30, has a support point 62 for the rear seat foot 24. The rear seat foot 24 is connected here in an articulated manner to the seat divider 42. The support point 62 here forms an axis of rotation, via which the rear seat foot 24 is connected pivotably to the seat divider 42. The seat divider 42 and the further seat divider 40 of the seat row 12, which seat divider 40 is connected to the seat divider 42 via the supporting tubes 28, 30, are pivotable about the axis of rotation which forms the support point 62 for the rear seat foot 24. The axis of rotation which forms the support point 62 for the rear seat foot 24 forms the axis about which the seat bottom 34 rotates during an adjustment of the airplane seat 10 between the use position and the stowage position. In principle, it would likewise be conceivable for the seat feet 20, 24 not to be connected directly to the seat divider 42. It would be conceivable here for the seat feet 20, 24 to be able to be coupled to the corresponding seat divider 42 via an intermediate piece. In principle, it is likewise conceivable for the seat feet 20, 24 to be connected directly to the supporting tubes 28, 30.

At a lower end of the backrest 32, the adjustment mechanism 44 has a coupling point 64, 66 via which the backrest 32 is coupled to the seat dividers 40, 42 in the use position. The coupling points 64, 66 are each arranged laterally at the lower end on the backrest 32. The coupling points 64, 66 each have form-fit elements via which the backrest 32 is in each case connectable in a form-fitting manner to the corresponding seat divider 40, 42. The coupling points 64, 66 have form-fit elements 68 which are designed as elevations and which extend laterally outward from the backrest 32 into a region behind the corresponding seat dividers 40, 42, to which they are coupled in a use position. The seat dividers 40, 42 have coupling points 70 formed in a corresponding manner to the coupling points 64, 66. The coupling points 70 are designed as form-fit elements 80 formed in a corresponding manner to the form-fit elements 68 of the coupling points 64, 66. The coupling points 70 here are designed as recesses which are introduced into a lower side of the second partial regions 52 of the seat dividers 40, 42. In a use position of the airplane seat 10, the form-fit elements 80 of the coupling points 64, 66 of the backrest 32 are arranged in a form-fitting manner in the coupling points 70, which are designed as recesses, of the seat dividers 40, 42. Via said form-fitting connection between the form-fit elements 80 of the coupling points 64, 66 of the backrest 32 and the coupling points 70, which are designed as recesses, of the seat dividers 40, 42, the backrest 32 is fixedly connected to the seat dividers 40, 42 in the use position.

The adjustment mechanism 44 comprises, per armrest 36, 38, retraction kinematics 72 which are provided for folding in the corresponding armrests 36, 38 during an adjustment of the airplane seat 10 into the stowage position. During an adjustment of the airplane seat 10 into the use position, the retraction kinematics 72 are each provided in order to unfold the corresponding armrests 36, 38 again. The retraction kinematics 72 for the two armrests 36, 38 are each of identical design, and therefore only one retraction kinematic 72 for the armrest 36 will be described in more detail below. The retraction kinematic 72 comprise a first lever 74 which is coupled pivotably to the backrest 32. The lever 74 is connected here by a first end in a pivotable manner to the lower side of the backrest 32. The lever 74 has a bearing bolt via which the lever 74 is connected pivotably to the backrest 32. The bearing bolt via which the lever 72 is coupled to the backrest 32 forms the form-fit element 68 of the coupling point 64. A head of the bearing bolt forms the form-fit element 68 of the coupling point 64. In principle, it is also conceivable for the form-fit element 68 of the coupling point 64 to be designed as a separate form-fit element formed separately from the bearing bolt. The lever 74 here has a slightly curved shape. The retraction kinematic 72 has a second lever 76. The second lever 76 is coupled by a first end pivotably to the seat divider 40. The second lever 76 is coupled by a second end to the armrest 36. The second lever 76 has a support point 78 via which the second lever 76 is connected pivotably to a second end of the first lever 74. The support point 78 is arranged approximately centrally here between the first end and the second end of the second lever 76.

The adjustment mechanism 44 in each case has a first connection element 82 and a second connection element 84 per seat foot pair, i.e. a front seat foot 20, 22 and a rear seat foot 24, 26 which are arranged in the same guide rail. The first connection element 82 connects the front seat foot 20 and the rear seat foot 24 of the one seat foot pair. The connection elements 82, 84 are each connected pivotably by their ends to a seat foot 20, 24 or to the coupling point 64, 66. The two connection elements 82, 84 are connected pivotably by a front end in a lower region of the front seat foot 20. The first connection element 82 is arranged here below the second connection element 84. The first connection element 82 is designed as a rectilinear bar element. In the use position, the first connection element 82 runs substantially parallel to the mounting plane on which the airplane seat 10 is mounted. The first connection element 82 is connected in an articulated manner by a second end to the rear seat foot 24. A connection of the first connection element 82 to the rear seat foot 24 lies here at the same height as a connection of the first connection element 82 to the front seat foot 20. The second connection element 84 is designed as a curved bar element. In the use position, the second connection element 84 runs here from its lower connection to the front seat foot 20 upward away from the mounting plane in the direction of the second seat foot 24. The second connection element 84 is connected by its second end in an articulated manner to the coupling point 68.

The airplane seat 10 is locked in its use position. The airplane seat 10 is locked here in the use position in such a manner that it cannot inadvertently move into the stowage position. The airplane seat 10 here has a locking mechanism (not illustrated specifically). The locking mechanism is preferably integrated here in the retraction mechanism 72. In principle, it would also be conceivable for the locking mechanism to be arranged in the coupling points between the backrest 32 and the seat dividers 40, 42 or between the seat dividers 40, 42 and the seat feet 20, 22, 24, 26. It is conceivable here for the locking mechanism to have latching and/or form-fit elements which connect two parts of the airplane seat 10, which parts are movable with respect to each other in order to reach the stowage position, to each other in a form-fitting manner.

Figure 1:
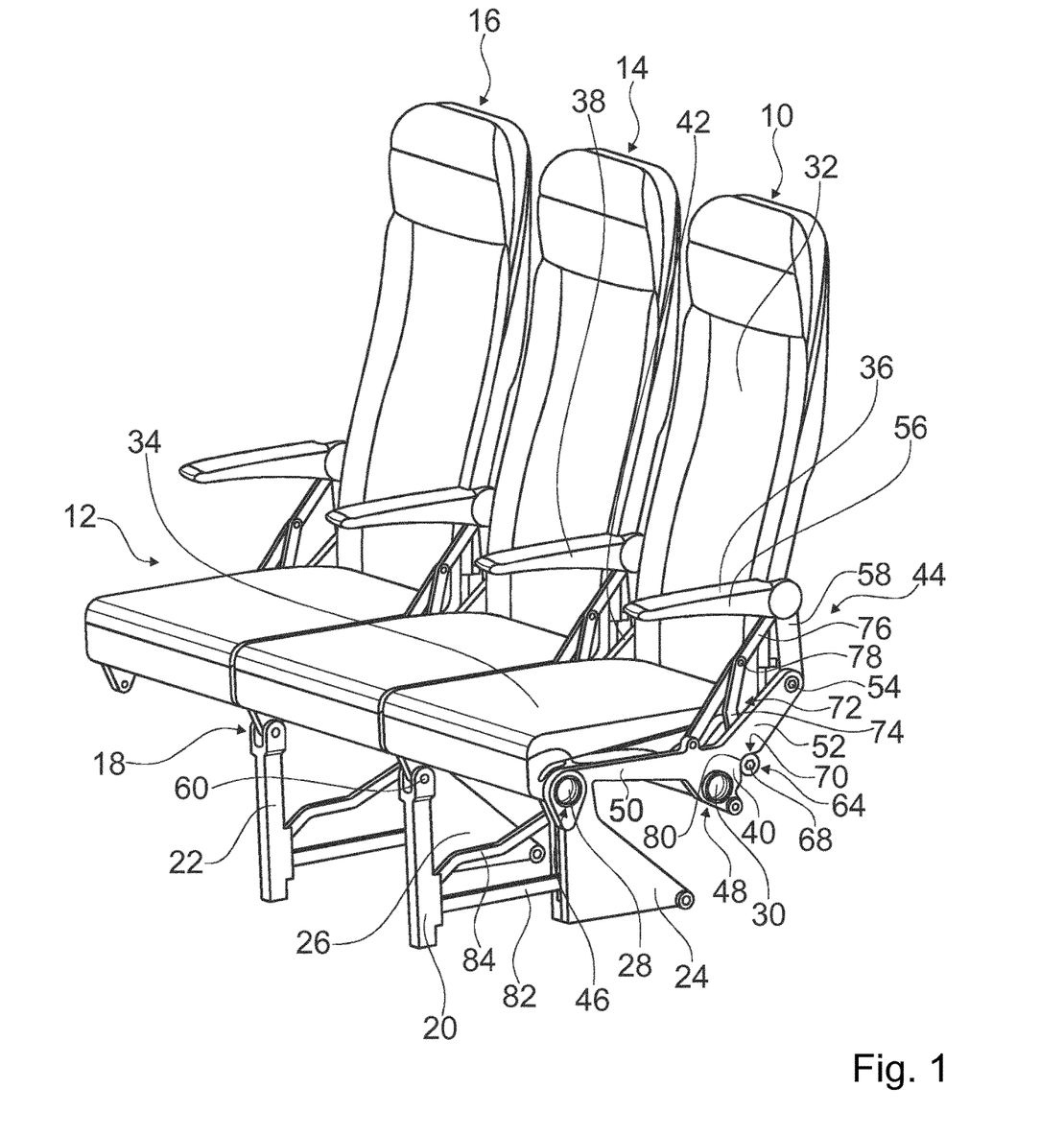
FIG. 1 shows a schematic illustration of an airplane seat device according to the invention with an airplane seat of a seat row in a use position.
Figure 2:
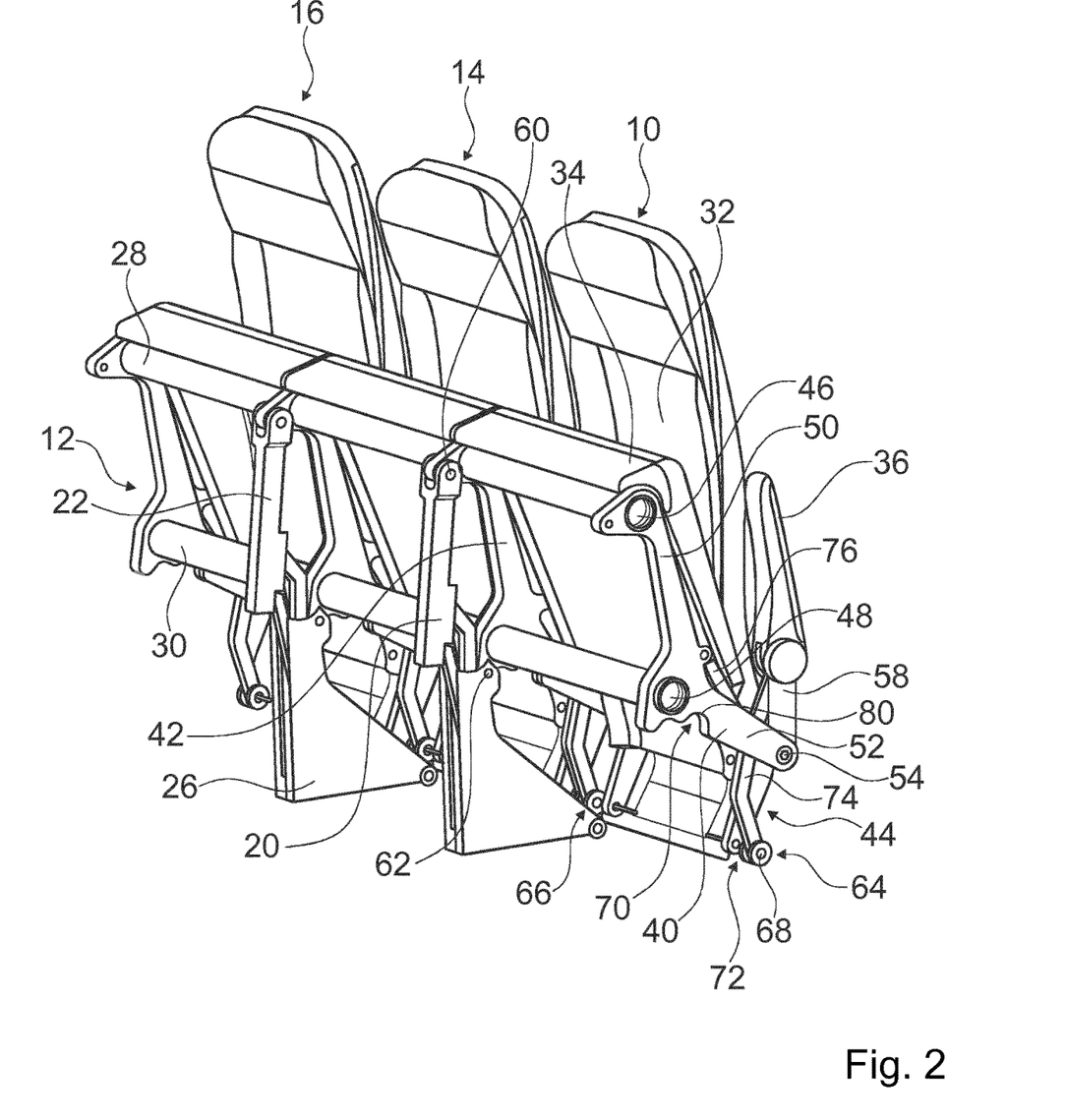
FIG. 2 shows a schematic illustration of the seat row with the airplane seat in a stowage position.
Figure 3:
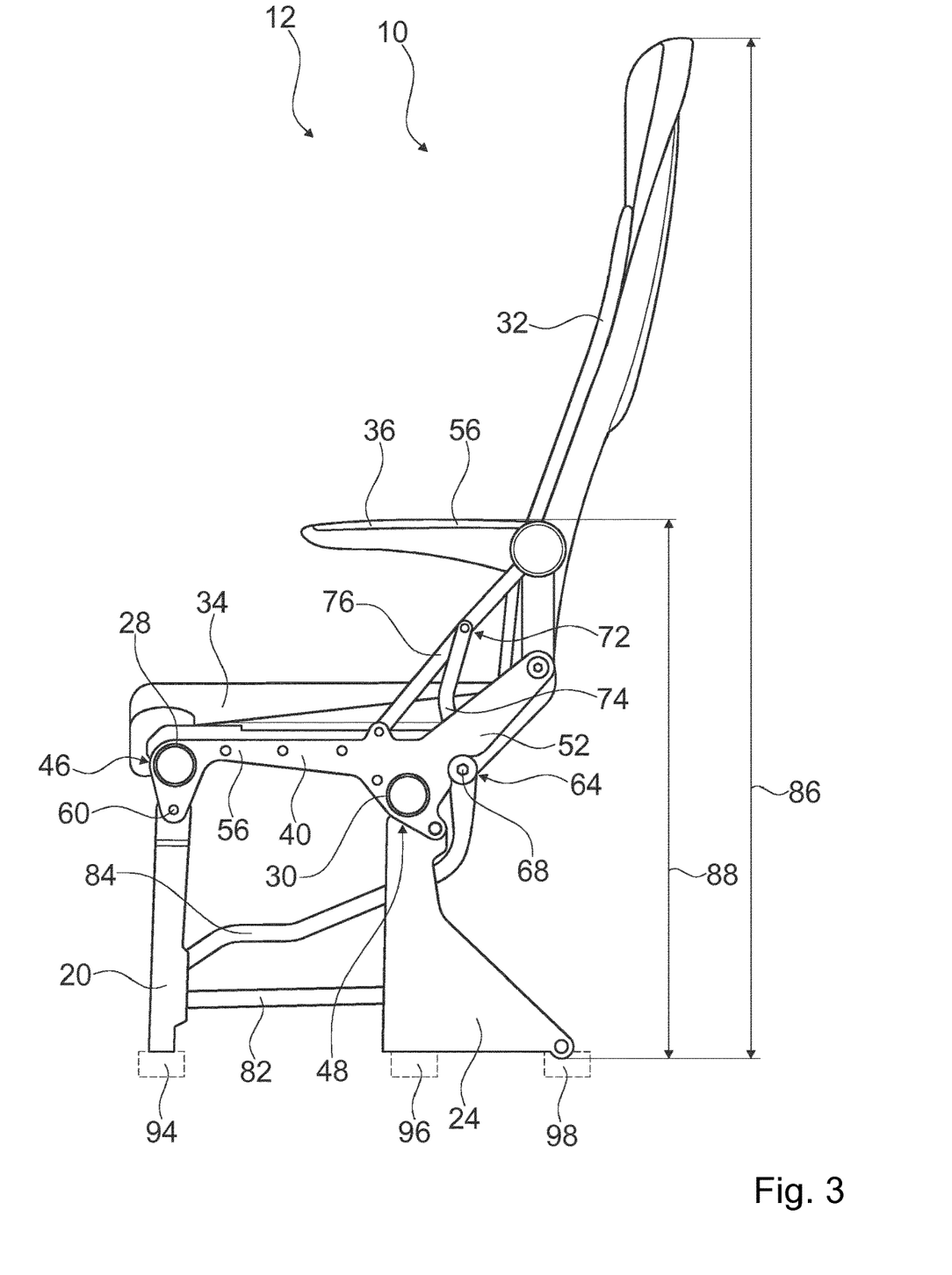
FIG. 3 shows a schematic side view of the airplane seat in the use position.
Figure 4:
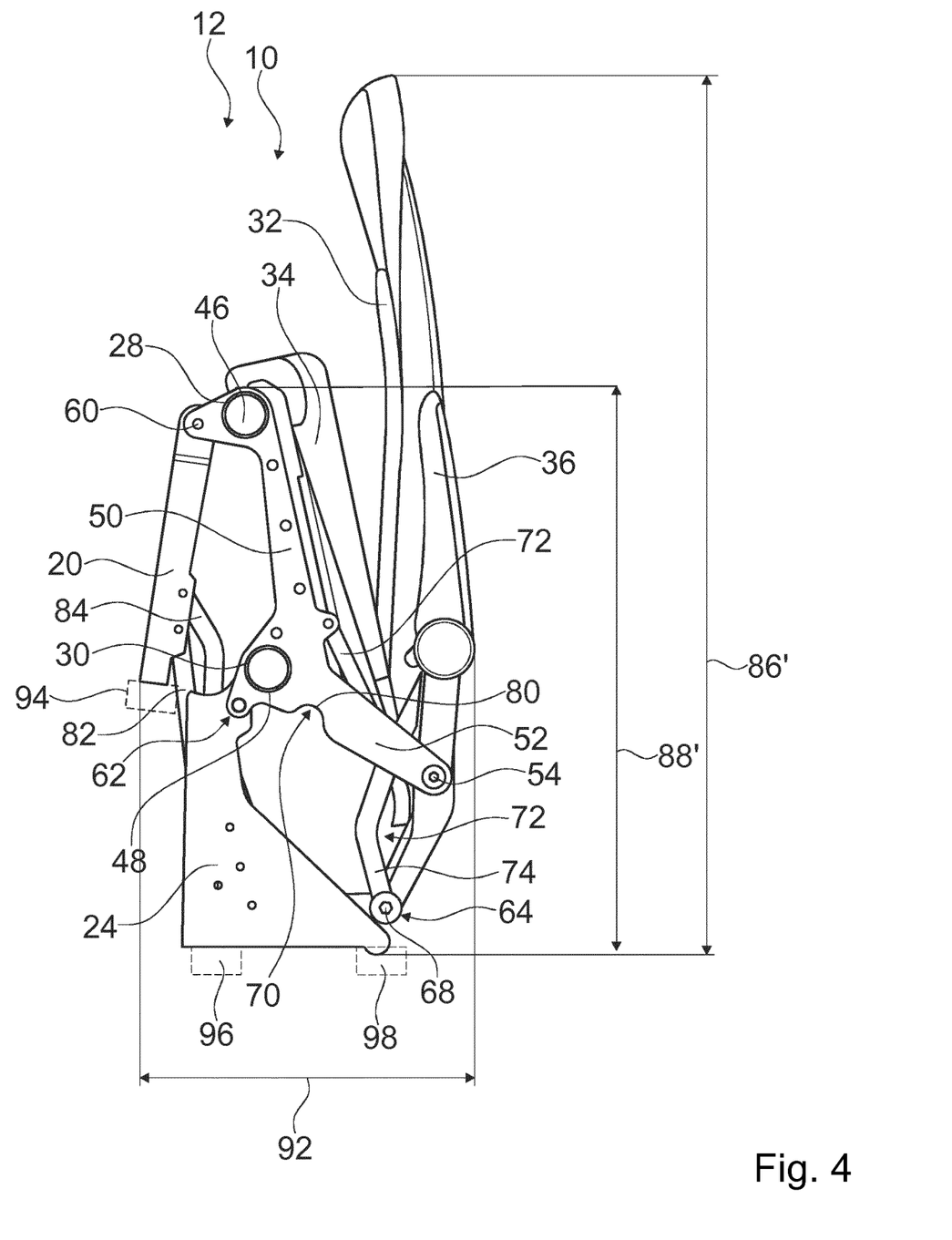
FIG. 4 shows a schematic side view of the airplane seat in the stowage position.

In the use position, the airplane seats 10, 14, 16 have a backrest height 86 of 45 inches (FIG. 1 and FIG. 2). The backrest height 86 forms the height which the airplane seats 10, 14, 16 have from the mounting plane as far as an upper edge of their backrest 32. In the use position, the airplane seat 10, which is arranged toward an aisle side, has an aisle side height 88 of 25 inches. The aisle side height 88 describes the height of the airplane seat 10 in the region of the seat divider 40 and the armrest 36, which faces the aisle in the airplane cabin. The aisle side height 88 here is in particular the height of the airplane seat 10 from an end of the airplane seat 10 that faces the aisle of the airplane cabin as far as that side of the backrest 32 which faces the aisle. In the stowage position, the airplane seat 10 has a backrest height 82 which is less than 45 inches. In the stowage position, the airplane seat 10 has an aisle side height 88 which is less than 25 inches.

During an adjustment of the airplane seat 10 from the use position into the stowage position, the backrest 32 is moved substantially vertically downward. As a result, the backrest height 86 of the airplane seat 10 is reduced during the adjustment from the use position into the stowage position. For the adjustment from the use position to the stowage position, the front seat feet 20, 22 are provided for being decoupled from the corresponding guide rail of the airplane cabin. For this purpose, the fittings 94 of the seat feet 20, 22 are detached from the guide rail of the airplane cabin. The front end of the airplane seat 10 and of the remaining airplane seats 14, 16 of the seat row 12 is thereby decoupled from the airplane cabin. The front end of the seat bottom 34 with the seat dividers 40, 42 and the supporting tubes 28, 30 can now be displaced about the axis of rotation of the support point 62, about which the seat dividers 40, 42 are formed pivotably with respect to the rear seat feet 24, 26, by means of the adjustment mechanism 44. The armrest 36 is folded in via the levers 74, 76 of the retraction kinematic 72. Furthermore, the lower end of the backrest 32 is moved downward in the direction of the mounting plane via the levers 74, 76 of the retraction kinematic 72. As a result, the coupling point 70 of the backrest 32 is detached from the coupling point 64 of the seat divider 40. The backrest 32 in its rest position is moved downward in the direction of the mounting plane. In the stowage position, the seat dividers 40, 42 are substantially tilted upward by 90 degrees in contrast to the use position. In contrast to the use position, in the stowage position rear ends of the seat dividers 40, 42 are displaced in the direction of the mounting plane. An adjustment of the airplane seat 10 from the stowage position into the use position takes place in a correspondingly reverse manner. By means of the adjustment of one airplane seat 10, 14, 16 of the seat row 12, all of the airplane seats 10, 14, 16 of the seat row 12 are always adjusted. As a result, all of the airplane seats 10, 14, 16 of a seat row 12 can simply be adjusted together between the use position and the stowage position. In the stowage position, the airplane seat 10 has a backrest height 86' which is less than 45 inches. In principle, it would also be conceivable for the backrest height 86' of the airplane seat 10 to have 45 inches in the stowage position. Owing to the fact that the backrest height 86' is 45 inches in the stowage position, airline and/or airplane manufacturer specifications can advantageously be met and an advantageous view in the airplane cabin guaranteed. In the stowage position, the airplane seat 10 has an aisle side height 88' which is less than 25 inches. In principle, it would also be conceivable that, in the stowage position, the airplane seat 10 has an aisle side height 88 of 25 inches. As a result, the airline and/or airplane manufacturer specifications can advantageously be met, according to which no elements of the airplane seat 10 may protrude beyond 25 inches into an aisle region. A width 92 of the airplane seat 10 in the seat direction is 14 inches in the stowage position. As a result, in the stowage position, the airplane seat 10 can be particularly advantageously of compact design.

In principle, it will be noted that it is conceivable that, for the adjustment from the use position into the stowage position, the front seat feet 20, 22 do not have to be detached with their fittings 94 from the guide rail. It is conceivable for the front seat feet 20, 22 to have a type of telescopic joint or kinematics, by means of which the seat feet 20, 22 are adjustable between two different lengths. The seat feet 20, 22 would be in their short position here in the use position. For the adjustment of the airplane seats 10, 14, 16 of the seat row 12 from the use position into the stowage position, it would be conceivable for the seat feet 20, 22 to be extended by means of the telescopic joint or kinematic configured in some other manner such that the seat dividers 40, 42, the seat bottom 34 and the supporting tubes 28, 30 can be pivoted in accordance with the above-described exemplary embodiment.

Figure 5:
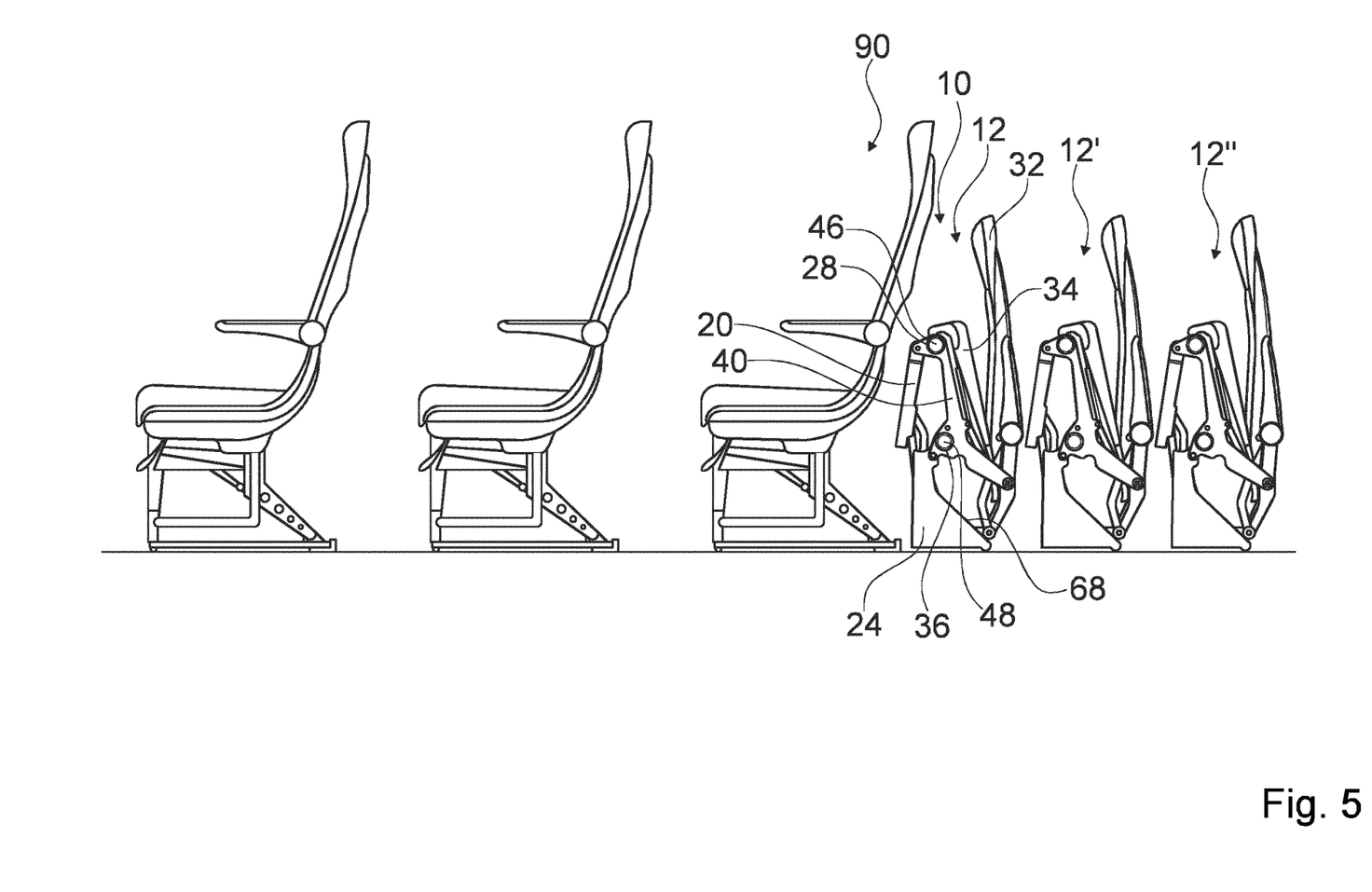
FIG. 5 shows a schematic view of a layout with a plurality of seat rows.

The two fittings 96, 98, via which a rear seat foot 24, 26 is in each case mounted in the guide rails of the airplane cabin, are provided to be detached such that the seat row 12 which is formed by the airplane seats 10, 14, 16 can be displaced in the airplane cabin. The seat row 12, when it is in the stowage position, can thus be pushed into a corresponding position in the airplane cabin such that it takes up as little space as possible. The seat row 12 here is part of a cabin layout which comprises a plurality of seat rows 12 arranged in the airplane cabin. The cabin layout here has, for example, four seat rows 12', 12" formed in an equivalent manner to the above-described seat row 12. Said seat rows 12, 12', 12" are advantageously arranged one behind another here. Furthermore, the airplane cabin has further seat rows 90 which have airplane seats which are not adjustable between a use position and a stowage position. A plurality of seat rows 90 are in each case arranged in front of and behind the adjustable seat rows 12, 12', 12". In principle, it would also be conceivable for the seat rows 12, 12', 12" to be arranged at one end of the airplane cabin and for the nonadjustable seat rows 90 merely to be arranged in front of the seat rows 12, 12', 12". Depending on the loading of the airplane, seat rows 12, 12', 12" could now be arranged in the use position or stowage position in the airplane cabin during a flight. If a plurality of seat rows 12, 12', 12" are arranged one behind another in the stowage position, the backrests 32 of the front airplane seats 10 at least partially overlap the seat bottom 34 and/or the mounting unit 18 of the airplane seat 10 arranged there behind. Seat rows 12, 12', 12" which are not required and are therefore arranged in the stowage position, could be pushed together in as space-saving a manner as possible. The nonadjustable seat rows 90 which are in use and the adjustable seat rows 12, 12', 12", 12 which are in use can now be correspondingly fastened at a greater or lesser distance from one another in the airplane cabin such that, in the event of a lower loading, seat rows 12, 12', 12", 90 having more leg room for passengers can be provided.

REFERENCE SIGNS

10 Airplane seat
12 Seat row
14 Airplane seat
16 Airplane seat
18 Mounting unit
20 Front seat foot
22 Front seat foot
24 Rear seat foot
26 Rear seat foot
28 Front support tube
30 Rear support tube
32 Backrest
34 Seat bottom
36 Armrest
38 Armrest
40 Seat divider
42 Seat divider
44 Adjustment mechanism
46 Receptacle
48 Receptacle
50 First partial region
52 Second partial region
54 Support point
56 Armrest body
58 Armrest carrier
60 Support point
62 Support point
64 Coupling point
66 Coupling point
68 Form-fit element
70 Coupling point
72 Retraction kinematics
74 Lever
76 Lever
78 Support point
80 Form-fit element
82 Connection element
84 Connection element
86 Backrest height
88 Aisle side height
90 Seat row
92 Width
94 Fitting
96 Fitting
98 Fitting

The invention claimed is:

1. An airplane seat device with at least one airplane seat which is at least configured to be adjusted between a use position and a stowage position, wherein, in the stowage position, the airplane seat has a maximum height which is equal to or less than a maximum height in the use position, wherein the airplane seat has at least one backrest and at least one adjustment mechanism, wherein the backrest is at least partially adjusted during an adjustment between the use position and the stowage position of the airplane seat by means of the adjustment mechanism, wherein the at least one adjustment mechanism moves the backrest substantially vertically downward during an adjustment from the use position into the stowage position,
   wherein the airplane seat has at least one front seat foot which, for the transfer of the airplane seat into the stowage position, is configured to be decoupled from a guide rail.

2. The airplane seat device as claimed in claim 1, wherein, in the stowage position, the airplane seat has an aisle side height which is less than 25 inches.

3. The airplane seat device as claimed in claim 1, wherein the airplane seat has at least one seat divider, at least one armrest and/or at least one seat bottom, wherein the seat divider, the armrest and/or the seat bottom are at least partially adjusted during an adjustment between the use position and the stowage position of the airplane seat by means of the adjustment mechanism.

4. The airplane seat device as claimed in claim 3, wherein, at a rear end of the seat divider, the adjustment mechanism has at least one support point via which the seat divider is rotatably connected to the backrest and/or to the armrest.

5. The airplane seat device at least as claimed in claim 3, wherein, at the lower end of the backrest, the adjustment mechanism has a coupling point via which the backrest is coupled to the at least one seat divider in the use position.

6. The airplane seat device at least as claimed in claim 5, wherein the at least one seat divider has at least one coupling point which is designed as a recess and in which the coupling point of the adjustment mechanism, implemented by the backrest, engages in a form-fit manner at least in the use position.

7. The airplane seat device at least as claimed in claim 3, wherein the adjustment mechanism has at least one retraction kinematic which is configured, during an adjustment, for folding in the armrest into the stowage position.

8. The airplane seat device at least as claimed in claim 3, wherein, in the region of a rear support tube connection of the seat divider, the adjustment mechanism realizes a support point via which the seat divider is coupled pivotably to the rear seat foot.

9. The airplane seat device as claimed in claim 1, wherein the airplane seat has at least one rear seat foot which is configured to be coupled to a guide rail via at least one coupling point.

10. The airplane seat device as claimed in claim 1, comprising at least one further airplane seat which realizes a seat row with the airplane seat.

11. The airplane seat device as claimed in claim 10, wherein the at least two airplane seats of a seat row are together adjustable between the use position and the stowage position.

12. The airplane seat device as claimed in claim 1, wherein the at least one airplane seat has a width of 14 inches in the stowage position.

13. An airplane seat for an airplane seat device as claimed in claim 1.

14. An airplane seat device with at least one airplane seat which is at least configured to be adjusted between a use position and a stowage position, wherein, in the stowage position, the airplane seat has a maximum height which is equal to or less than a maximum height in the use position, wherein the airplane seat has at least one seat divider and at least one adjustment mechanism, wherein the seat divider is at least partially adjusted during an adjustment between the use position and the stowage position of the airplane seat by means of the adjustment mechanism, wherein the airplane seat has at least one rear seat foot which is configured to be coupled to a guide rail via at least one coupling point, wherein, in a region of a rear support tube connection of the seat divider, the adjustment mechanism realizes a support point via which the seat divider is coupled pivotably to the rear seat foot.

15. An airplane seat device with at least one airplane seat which is at least configured to be adjusted between a use position and a stowage position, wherein, in the stowage position, the airplane seat has a maximum height which is equal to or less than a maximum height in the use position, wherein the airplane seat has at least one backrest and at least one adjustment mechanism, wherein the backrest is at least partially adjusted during an adjustment between the use position and the stowage position of the airplane seat by means of the adjustment mechanism, wherein the at least one adjustment mechanism moves the backrest substantially vertically downward during an adjustment from the use position into the stowage position,
 wherein the airplane seat has at least one rear seat foot which is configured to be coupled to a guide rail via at least one coupling point.

\* \* \* \* \*